(12) United States Patent
Mandralis et al.

(10) Patent No.: US 6,358,552 B1
(45) Date of Patent: Mar. 19, 2002

(54) AROMA PRODUCT RESULTING FROM RECOVERY PROCESS

(75) Inventors: Zenon Ioannis Mandralis, Dublin; Scott Westfall; Kenneth A. Yunker, both of Marysville, all of OH (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/575,719

(22) Filed: Aug. 2, 2000

Related U.S. Application Data

(62) Division of application No. 09/057,741, filed on Apr. 9, 1998, now Pat. No. 6,149,957.

(51) Int. Cl.[7] ............................................... A23F 5/00
(52) U.S. Cl. ........................ 426/594; 426/434; 426/306; 426/471
(58) Field of Search .................................. 426/594, 434, 426/386, 471

(56) References Cited

U.S. PATENT DOCUMENTS

| | | | |
|---|---|---|---|
| 3,535,118 A | 10/1970 | Klein et al. ................... 99/71 |
| 3,987,207 A | 10/1976 | Spaeti et al. ................... 426/99 |
| 4,092,436 A | 5/1978 | MacDonald et al. ........ 426/478 |
| 4,100,305 A | 7/1978 | Gregg ......................... 426/385 |
| 4,100,306 A | 7/1978 | Gregg et al. ................. 426/385 |
| 4,118,521 A | * 10/1978 | Cazenave |
| 4,204,464 A | 5/1980 | Strobel ......................... 99/286 |
| 4,378,380 A | 3/1983 | Scarpellino ................. 426/533 |
| 4,557,938 A | 12/1985 | Sander et al. ................ 426/453 |
| 4,692,340 A | 9/1987 | Grutte et al. ................. 426/72 |
| 4,794,010 A | * 12/1988 | Jones et al. |
| 4,900,575 A | 2/1990 | Cale et al. ................... 426/387 |
| 5,008,125 A | * 4/1991 | Cale et al. |
| 5,030,473 A | 7/1991 | Ghodsizadeh ............... 426/650 |
| 5,182,926 A | 2/1993 | Carns et al. ................... 62/352 |
| 5,323,623 A | 6/1994 | Carns et al. ................... 62/352 |
| 5,451,421 A | 9/1995 | Tanihara et al. ............. 426/589 |
| 5,916,612 A | 6/1999 | Bonnasse et al. ............. 426/96 |

FOREIGN PATENT DOCUMENTS

| | | | |
|---|---|---|---|
| CA | 915981 | 12/1972 | ................. 426/386 |
| EP | 0 043 667 | 1/1982 | |
| EP | 0 363 529 | 4/1990 | |
| EP | 0 574 034 | 12/1993 | |
| EP | 0 594 152 | 4/1994 | |
| EP | 0 787 437 | 8/1997 | |
| EP | 0 954 985 | 11/1999 | |
| FR | 1005798 | 4/1952 | |
| GB | 946 346 | 1/1964 | |
| GB | 998016 | 7/1965 | |
| GB | 1 466 881 | 3/1977 | |
| WO | WO 97/10721 | 3/1997 | |
| WO | WO 97/16078 | 6/1997 | |

OTHER PUBLICATIONS

Japanese patent application 61/224933 (Oct. 1986) abstract.
Japanese patent application 08/131132 (May 1996) abstract.
Sivetz et al., "Coffee Technology", AVI Publishing Company, Inc., pp. 334–335, 1979.

* cited by examiner

Primary Examiner—Anthony J. Weier
(74) Attorney, Agent, or Firm—Winston & Strawn

(57) ABSTRACT

An aroma product resulting from the recovery of aroma components from coffee. A slurry of coffee grounds in an aqueous liquid is subjected to stripping for stripping aroma components from the slurry. The stripping is carried out using gas in a substantially counter-current manner to provide an aromatized gas containing aroma components. The aroma components are then collected from the aromatized gas. The aroma components may be added to concentrated coffee extract prior to drying of the extract. The coffee powder produced has much increased and improved aroma and flavor and contains higher levels of furans and diketones.

15 Claims, 1 Drawing Sheet

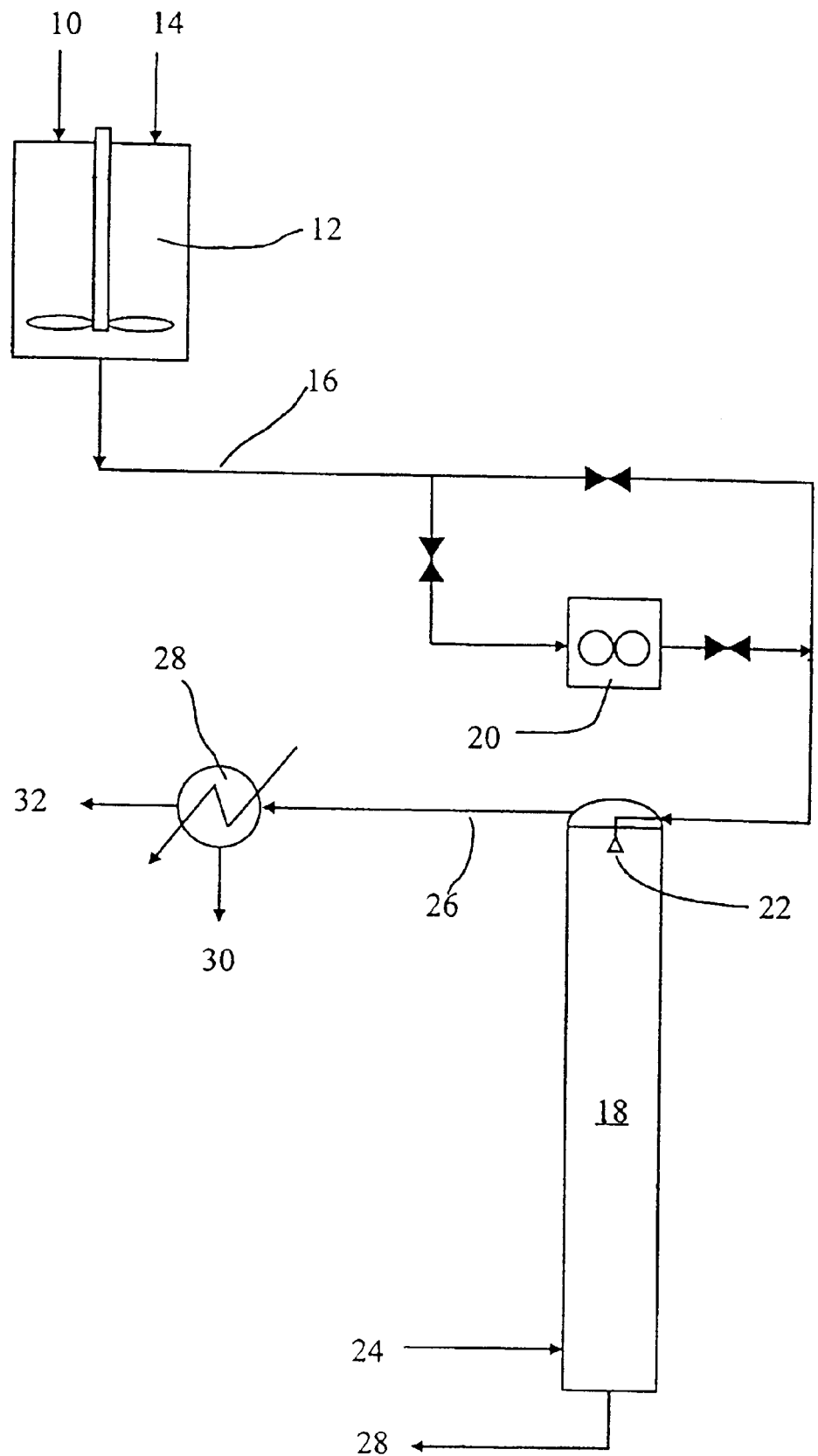

AROMA PRODUCT RESULTING FROM RECOVERY PROCESS

CROSS-REFERENCE TO RELATED APPLICATION

This application is a division of U.S. application Ser. No. 09/057,741 filed Apr. 9, 1998, now U.S. Pat. No. 6,149,957, the content of which is expressly incorporated herein by reference thereto.

STATEMENT REGARDING FEDERALLY SPONSORED RESEARCH

Not Applicable

REFERENCE TO A MICROFICHE APPENDIX

Not Applicable

FIELD OF THE INVENTION

This invention relates to a process for the recovery of coffee aroma prior to extraction and to the aroma so recovered. The recovered aroma is useful for aromatizing instant coffee.

BACKGROUND OF THE INVENTION

Aromas are an important part of many products since consumers associate certain aromas with certain products. If the product lacks the aroma associated with it, consumer perception of the product is adversely affected. This is particularly a problem in the field of instant coffees, although it also exists in other fields. Instant coffee powders which are obtained from commercial processes involving extraction, concentration and drying, are usually substantially aroma-less. For this reason, it is conventional to recover coffee aromas which are given off during the processing of the instant coffee and to reincorporate these aromas into the concentrated coffee extract prior to drying or into the instant coffee powder.

The coffee aromas are recovered at several points during processing of the instant coffee and most commonly during grinding of the roasted beans and by steam stripping of the coffee extract prior to concentration and drying of the coffee solids.

The recovery of aroma from ground coffee is disclosed in U.S. Pat. No. 3,535,118. This patent discloses a process in which roast and ground coffee is placed in a column and maintained at about 40° C. The bed of coffee is then moistened by spraying water on it to assist in displacing aromas from the coffee particles. An inert gas, usually nitrogen, is heated to about 44° C. and introduced into the column from beneath the bed. As the inert gas passes up through the bed, it strips the aromas from the coffee particles. The inert gas is then fed to a condenser which is operated at a temperature of about 50° C. to condense water in the inert gas. The de-watered inert gas is ultimately fed to a cryogenic condenser to condense the aroma as a frost. The frost is then recovered.

Another process for recovering aroma from roast and ground coffee is described in international patent application WO 97/10721. In this process, the ground coffee is transported through an elongated mixing zone while being agitated. At the same time, an aqueous fluid is sprayed into the elongated mixing zone to moisten the ground coffee as the ground coffee is being transported and agitated. Aroma gases released by the moistened ground coffee in the elongated mixing zone are drawn off and are collected. A similar processes are described in UK patent 1,466,881 and U.S. Pat. No. 4,092,436.

One of the problems perceived to arise with these processes is that they results in pre-wetting of the coffee grounds outside of the extraction cell or column. According to Sivetz, M and Desrosier N. W.; 1979; Coffee Technology, AVI Publishing Company, Inc., page 334, this practice is bad because it "causes staling of ground coffee in less than an hour, accompanied by a heavy, undesirable flavor and a loss in natural coffee volatiles". Sivetz and Desrosier strongly advocate that first wetting of the coffee grounds should occur in the extraction cell or column. Consequently recovery of aroma from ground coffee by pre-wetting it is not common practice; despite ground coffee being a good source of aroma.

Further, not all components of the aroma obtained in a cup of freshly brewed coffee are captured during pre-wetting. Consequently, unless further aroma is captured later during the process, some aroma components are lost; components which would, if incorporated into instant coffee powder, improve the aroma of a beverage prepared from the instant coffee powder. Further, many of the conventional recovery techniques damage or alter the aroma components.

Therefore there is still a need for a process for recovering aroma from ground coffee.

SUMMARY OF THE INVENTION

Accordingly, in one aspect, this invention provides a process for the recovery of aroma components from coffee, the process comprising:

providing a slurry of coffee grounds in an aqueous liquid;

stripping aroma components from the slurry using gas in a substantially counter-current manner for providing an aromatized gas containing aroma components; and collecting the aroma components from the aromatized gas.

The process provides the advantage that significantly larger amounts of aroma components may be stripped from the coffee than is the case with conventional processes. Further, since the aroma components are stripped from the coffee prior to extraction, thermal degradation of the aroma is reduced to a minimum. Also, these aroma components may be readily reincorporated to provide a soluble coffee product which has increased and improved aroma and flavor.

The slurry of coffee grounds may be provided by slurrying roasted and ground coffee with the aqueous liquid, or by slurrying whole coffee beans with the aqueous liquid and then subjecting the coffee beans to grinding. The coffee grounds preferably have an average particle size in the range of about 1 mm to about 3 mm.

The process preferably further comprises the steps of adding the collected aroma components to a concentrated coffee extract and drying the coffee extract to powder for providing an aromatized soluble coffee powder.

The process may further comprise the step of concentrating the collected aroma components.

The aroma components may be collected by subjecting the aromatized gas to one or more condensation operations. Preferably, in a first operation, the aromatized gas is subjected to condensation at a temperature in the range of about 0° C. to about 50° C. and, in a second operation, the aromatized gas is subjected to cryogenic condensation at a temperature of less than about −80° C. The first operation may be carried out in one or more steps. For example, the aromatized gas may be subjected to condensation at a temperature in the range of about 80° C. to about 95° C. and, in a second step, at a temperature in the range of about 0° C. to about 10° C. Alternatively, the aromatized gas may be subjected to condensation at a temperature in the range of about 20° C. to about 50° C.

Preferably the aroma components are stripped from the slurry in a disc and donut stripping column. The gas used to strip the aroma components is preferably low pressure gas; for example steam at a gauge pressure of less than about 100 kPa.

In another aspect, this invention provides an aromatized, spray-dried soluble coffee powder which comprises least about 0.35 equivalent $\mu$g/g furans and at least about 0.25 equivalent $\mu$g/g diketones.

In yet another aspect, this invention provides an aromatized, freeze-dried soluble coffee powder which comprises least about 0.60 equivalent $\mu$g/g furans and at least about 0.40 equivalent $\mu$g/g diketones.

The invention also provides aromatized soluble coffee powders produced by the processes defined above.

BRIEF DESCRIPTION OF THE DRAWING

Embodiments of the invention are now described, by way of example only, with reference to the drawing which is a schematic flow diagram of an aroma recovery process.

DETAILED DESCRIPTION OF THE INVENTION

Referring to FIG. 1, roasted coffee 10 is introduced into a mixing tank 12. The mixing tank 12 is sealed to prevent aroma loss. Alternatively, any aroma components escaping from the mixing tank 12 should be collected; for example by directing the aroma components to a condenser. The coffee 10 may be in the form of whole beans or may be ground. If ground coffee is used, the particle size of the coffee is preferably in the range of about 1 to about 3 mm. Roasted coffee surrogates, such as chicory, may also be added to the mixing tank 12. An aqueous liquid 14 is also introduced into the mixing tank 12 in order to slurry the coffee 10. The aqueous liquid 14 is conveniently water or coffee extract obtained from a downstream extraction operation. The use of coffee extract is preferred. The temperature of the aqueous liquid 14 is preferably in the range of about 20° C. to about 99° C.; for example about 80° C. to about 99° C.

The amount of aqueous liquid used to slurry the coffee 10 is not critical but is suitably sufficient such that the solids content of the resulting slurry 16 is about 1% to about 30% by weight. A solids content of about 5% to about 15% by weight is preferred.

The slurry 16 is transported to the top of a stripping column 18. If the coffee in the slurry 16 was not ground prior to forming of the slurry 16, the slurry 16 is diverted to a wet grinder 20 prior to being transported to the stripping column 18. The whole beans in the slurry 16 are then ground in the wet grinder to a suitable particle size; for example in the range of about 1 to about 3 mm. Any suitable wet grinder 20 may be used. Suitable slurry pumps (not shown) are used to transport the slurry 16 to the stripping column 18.

The temperature of the slurry 16 prior to being introduced into the stripping column 18 is preferably above about 90° C. This may be achieved by using an aqueous liquid 14 at a temperature above about 90° C. or by subjecting the slurry 16 to heating; preferably indirect heating.

The slurry 16 is introduced into the stripping column 18 through a suitable distributor 22 and flows downwardly through the stripping column 18. A stripping gas 24, conveniently steam but which may also be nitrogen, carbon dioxide or mixtures of steam, nitrogen, and carbon dioxide, is introduced into the stripping column 18 adjacent the bottom of the stripping column 18. The stripping gas 24 flows upwardly through the stripping column 18, substantially counter-current to the slurry. As the stripping gas 24 flows through the stripping column 18, it strips and transports aroma components from the coffee in the slurry. A gas stream 26 made up of the steam, gas liberated from the coffee, and transported aroma components is removed from the top of the stripping column 18. A stripped slurry 28 is removed from the bottom of the stripping column 18.

The amount of stripping gas 24 used to strip the aroma components from the slurry 16 may be selected as desired within the constraints of the type of stripping column 18 selected. Strip rates of about 5% to about 100% by weight of steam to dry coffee introduced may be suitable. For lower stripping rates, for example about 10% to about 20%, the total amount of aroma components removed from the slurry is less. However less moisture, which may dilute the coffee extract produced downstream when the aroma is recombined with the extract, is collected. The pressure of the steam used is preferably below about 100 kPa (gauge); for example below about (20 kPa gauge). The water used to generate the steam is preferably subjected to de-oxygenation prior to being formed into steam. If desired, inert carrier gases such as nitrogen may be introduced into the stripping column along with the stripping gas 24.

Any suitable stripping column 18 may be used; packed or plate. Suitable stripping columns are well known in the art and the skilled person may readily select a suitable column depending upon the process conditions and fluid characteristics. However, it is found that disc and donut columns operate reasonably well, particularly since they are less susceptible to plugging.

The gas stream 26 leaving the top of the stripping column 18 is then processed to capture the aroma components. This may be carried out using conventional techniques. For example, the gas stream 26 may be led to a condenser system 28. The condenser system 28 is operated at a temperature sufficiently low to condense most of the aroma from the gas stream 26. A temperature of below about 50° C. is suitable although cooling to below 30° C. is preferred. Preferably more than one condenser is used; each succeeding condenser being operated at a lower temperature than the previous condenser.

Preferably the downstream most condenser is operated at a temperature of about 0° C. to about 10° C.

If it is desired to concentrate the aroma components using partial condensation, the gas stream may be subjected to a first condensation step at a high temperature; for example at about 80° C. to about 95° C. This will result in the condensation of primarily water. The non-condensing and concentrated aroma components may then be subjected to a second condensation step at a lower temperature; for example at about 0° C. to about 50° C. to provide the aroma liquid 30.

The aroma liquid 30 removed from the condenser system 28 contains aroma components which may be used to aromatize coffee extract as explained below.

Aroma components 32 which do not condense in the condenser system 28 may be directed to a cryogenic aroma condenser (not shown) for collection. Many suitable cryogenic aroma condensers are known and have been reported in the literature. However, a particularly suitable cryogenic aroma condenser is described in U.S. Pat. Nos. 5,182,926 and 5,323,623; the disclosures of which are incorporated by reference. Further details of the operation of this cryogenic aroma condenser may be obtained from the disclosures in the patents. Plainly other cryogenic aroma condensers may be used; for example that disclosed in U.S. Pat. No. 5,030,473. The aroma collected in the cryogenic aroma condenser is in the form of a frost. The frost may be used to aromatize coffee extract as explained below. Alternatively, the frost may be combined with a suitable carrier substrate such as coffee oil or an emulsion containing coffee oil. This aromatized carrier is conveniently added to the soluble coffee powder finally produced.

The stripped slurry 28 leaving the bottom of the stripping column 18 is transported to an extraction system (not shown). The extraction system may be any suitable system since this aspect is not critical to the invention. Suitable extraction systems include batteries of fixed bed cells, plug flow reactors, moving bed reactors and the like. During the extraction process, the coffee grounds may be subjected to one or more thermal solubilization steps.

The coffee extract leaving the extraction system is then concentrated as is conventional. However, some of the coffee extract may be used as the aqueous liquid 14 instead of being concentrated. The aroma liquid 30 removed from the condenser system 28 may then be added to the concentrated extract. If desired, the aroma components in the aroma liquid 30 may be concentrated prior to being added to the concentrated extract. This may be necessary to avoid dilution of the concentrated extract if higher stripping rates were used in the stripping column. Concentration may be carried out using conventional procedures such as partial condensation, rectification, membrane concentration and freeze concentration.

Also, the frost obtained from the cryogenic aroma collector may be added to the concentrated extract. The aromatized extract is then dried in the usual manner to provide an aromatized, soluble coffee powder; for example by spray- or freeze-drying. Of course, the aroma liquid 30 and aroma frost may be used for other aromatization purposes.

It is found that the process results in an aromatized coffee powder which has much more aroma and flavor than produced by conventional techniques. When dissolved in hot water, the powder provides a product which has increased flavor and aroma strength; especially in coffeeness, body and roastiness.

In particular, the coffee powder products contain higher amounts of furans and diketones than conventional coffee powder products. Furans and diketones contribute to the aroma and flavor of beverages produced from the coffee powder products to improve the beverages.

When produced by spray drying, the coffee powder products contain at least about 0.30 equivalent μg/g furans and at least about 0.25 equivalent μg/g diketones. Preferably, the coffee powder product further contains at least about 0.02 equivalent μg/g of each of 5-methylfirflral and 2,3-hexanedione. More preferably, the coffee powder products at least about 0.04 equivalent μg/g of 2,3-hexanedione.

When produced by freeze drying, the coffee powder products contain at least 0.60 equivalent μg/g furans and at least 0.40 equivalent μg/g diketones. Preferably, the coffee powder product further contains at least 0.02 equivalent μg/g of each of 5-methylfurfural and 2,3-hexanedione. More preferably, the coffee powder products contains at least about 0.65 equivalent μg/g furans, at least about 0.04 equivalent μg/g of each of 5-methylfurfural, 2-methyl-pyrazine and 2,3-hexanedione.

In this specification, the term "Furans" means compounds of the furan class including furan, 2-methylfuran, 3-methylfuran, 2,5-dimethylfuran, 2-vinylfuran, dihydro-2-methyl-3 (2H)furanone, 2-furancaboxaldehyde, 2-vinyl-5-methylfuran, 2-furanemethanol, 5-methylfurfural, 2-furanmethanol acetate, 2-[(methylthio)methyl]furan, 2,2'-methylenebisfuran, and 1-(2-furanylmethyl)-pyrrole.

The term "Diketones" means compounds of the diketone class including 2,3-butanedione, 2,3-pentanedione and 2,3-hexanedione.

The term "equivalent μg/g" means equivalent μg of methyl butyrate per g of roast and ground coffee.

EXAMPLES

Specific examples of the invention are now described to further illustrate the invention. In these examples, aroma components are analyzed using gas chromatography and mass spectrometry. The aroma components are introduced into the gas chromatograph using a purge and trap method. The components separated in the gas chromatograph are detected using a mass spectrometer. The conditions of the gas chromatograph and mass spectrometer are as follows:

TABLE 1

| | |
|---|---|
| Column | Restek RTX-1 60 m × 0.25 mm × 1.0 μm |
| Flow rate | 20 ml/minute in He carrier gas |
| Split ratio | 20:1 |
| Initial temperature | 35° C. |
| Initial hold time | 1 minute |
| Temperature increase rate | 4° C. per minute |
| Final temperature | 230° C. |
| Solvent delay | 0 minutes |
| Scan range | 35 to 260 amu |
| Electron energy | 70 volts |

All results are expressed in equivalent μg of methyl butyrate per g of roast and ground coffee.

The detection limits of the analytical procedure for certain of the compounds are as follows:

TABLE 2

| Compound | Detection limit |
|---|---|
| 2-methylpyriazine | 0.02 |
| 2,3-hexanedione | 0.02 |
| 5-methylfurfural | 0.02 |

Of course it is possible that lower amounts of these compounds may be detected using other techniques.

Example 1

Roast and ground coffee is fed into a slurry tank at a rate of about 2.7 kg/minute. The roast and ground coffee has an average particle size of about 1.4 mm. A coffee extract containing about 8 to 10% by weight of soluble coffee solids is also fed into the slurry tank at a rate of about 27 kg/minute.

The resulting slurry is fed to the top of a disc and donut stripping column using a slurry pump. The column has 12 stages. The internal diameter of the column is 23 cm and the height of each stage is 20 cm. Steam at a low pressure of less than about 20 kPa (gauge) is fed into the bottom of the stripping column. The flow rate of the steam is varied to provide a range of stripping rates between 15% and 90% by weight of steam compared to roast and ground coffee.

The aromatized gas stream leaving the stripping column is condensed in a condenser operating at about 20° C. The condensed liquid is collected and analyzed for aroma components. The uncondensed gas is transported to a cryogenic aroma collector operated as described in U.S. Pat. No. 5,182,926. The aroma frost collected in the cryogenic aroma collector.

The stripped slurry leaving the stripping column is then subjected to extraction in a continuous extraction system made up of three extraction reactors and two solubilization reactors. The yield is about 50 to 53% by weight. The extract obtained is concentrated to provide a concentrated extract containing above about 40% by weight of soluble coffee solids.

The condensed liquid from the condenser is added to the concentrated extract and the extract is dried to soluble powder in a spray-drying tower. The process is repeated except that the frost from the cryogenic aroma collector is also added to the concentrated extract.

A teaspoon of each soluble powder is dissolved in 150 ml of hot water at 85° C. All beverages produced have a brew-like flavor and aroma with good coffeeness, acidity, body and roastiness. The beverages produced from soluble powder produced at higher stripping rates have more flavor and aroma. The beverage produced from the soluble powder having the frost added to it has perceivably more above-the-cup aroma and roastiness.

Example 2

The process of Example 1 is repeated except that whole roasted beans are fed into the slurry tank. The resulting slurry is then fed to a wet, in-line grinder in which the beans are ground to an average particle size of about 2.4 mm. The slurry is then transported to the stripping column. The stripping rate in the column is 90% by weight of steam compared to roast and ground coffee. The aromatized gas stream leaving the stripping column is then subjected to concentration by rectification in a packed rectification column. The rectification section of the column is 1.5 m long and the stripping section is 1.2 m long. The boil up rate is fixed at 720 ml/minute. The liquid condensing in the rectification condenser is collected and comprises about 10% by weight of the roast and ground coffee.

A teaspoon of each soluble powder is dissolved in 150 ml of hot water at 85° C. All beverages produced have a brew-like flavor and aroma. Further, the beverages are perceived to have more roastiness, body and balance than the beverages produced in Example 1.

Example 3

Roast and ground coffee is extracted, without stripping of the aroma prior to extraction, in a continuous extraction system made up of three extraction reactors and two solubilization reactors. The extraction conditions are substantially identical to those of Example 1. The extract obtained is then subjected to steam stripping in a stripping column in a conventional manner. The aromatized gas stream leaving the stripping column is condensed in a condenser operating under conditions substantially identical to those of the condenser of Example 1.

The extract leaving the stripping column is concentrated to provide a concentrated extract containing above about 40% by weight of soluble coffee solids. The condensed liquid from the condenser is added to the concentrated extract and the extract is dried to soluble powder in a spray-drying tower.

A teaspoon of each soluble powder is dissolved in 150 ml of hot water at 85° C. and the beverage analyzed for aroma components. The results are as follows:

TABLE 3

| Sample | Aroma Count (grams of roast and ground coffee equivalents) |
| --- | --- |
| Example 1, 15% strip, without frost | 3.6 |
| Example 1, 15% strip, with frost | 6 |
| Example 1, 30% strip, without frost | 6 |
| Example 1, 30% strip, with frost | 8.5 |
| Example 1, 90% strip, without frost | 8.5 |
| Example 1, 90% strip, with frost | 18.5 |
| Example 3 | 1.5 |

All soluble coffee beverages produced from the process of Example 1 have higher aroma counts; even at low stripping rates. Further, the beverage produced from the powder of Example 3 is perceived to have less flavor and aroma.

Example 4

The process of Example 1 is repeated at a stripping rate of 40% by weight of steam compared to roast and ground coffee. The aromatized gas stream leaving the stripping column is then subjected to concentration by partial condensation. Two condensers are used; a first condenser operating at about 90° C. to about 100° C. and a second condenser operating at about 5° C. to about 15° C.

The liquid condensing in the first condenser contains primarily water and is disposed of. The liquid condensing in the second condenser is collected and comprises about 15% by weight of the roast and ground coffee.

The concentrated extract is freeze-dried instead of spray-dried to powder.

The aroma strength of a beverage produced from the powder of this example is compared to that of a beverage produced from the powder of Example 3:

TABLE 4

| Sample | Aroma Count (grams of roast and ground coffee equivalents) |
| --- | --- |
| Example 4 | 4 |
| Example 3 | 1.5 |

The beverage produced from the powder of this example has higher aroma counts. Further, the beverage produced from the powder of Example 3 is perceived to have less flavor and aroma.

Example 5

The process of Example 1 is repeated at a stripping rate of 40% or 90% by weight of steam compared to roast and ground coffee. The aromatized gas stream leaving the stripping column is then subjected to concentration by rectification in a packed rectification column. The rectification section of the column is 1.5 m long and the stripping section is 1.2 m long. The boil up rate is fixed at 720 ml/minute.

The liquid condensing in the rectification condenser is collected and comprises about 10% by weight of the roast and ground coffee.

The concentrated extract is either freeze-dried or spray-dried to powder.

The aroma strength of a beverage produced from the powder of this example is compared to that of a beverage produced from the powder of Example 3:

TABLE 5

| Sample | Aroma Count (grams of roast and ground coffee equivalents) |
| --- | --- |
| Example 5, spray-dried, 40% strip | 4.4 |
| Example 5, spray-dried, 90% strip | 6.8 |
| Example 5, freeze-dried, 90% strip | 6.8 |
| Example 3 | 1.5 |

The beverage produced from the powder of this example has much higher aroma counts. Further, the beverage produced from the powder of Example 3 is perceived to have less flavor and aroma.

Example 6

Four commercially available coffee products are used: a NESCAFÉ product purchased in the UK, a MAXWELL HOUSE product, a FOLGERS product and a KROGERS product; a soluble powder produced according to Example 1 at 15% strip without frost addition, and each of the spray dried soluble powders of Example 5. All products have been spray-dried. A teaspoon of each soluble powder is dissolved in 150 ml of hot water at 85° C. and the beverage analyzed for aroma components. The results are as follows:

TABLE 6

| Component | Example 1 | Example 5 (40% strip) | Example 5 (90% strip) | Nescafé ® product | Maxwell House ® product |
| --- | --- | --- | --- | --- | --- |
| Total Aroma | 3.6 | 4.4 | 6.8 | 3.7 | 2.3 |
| Furans | 0.350 | 0.52 | 0.480 | 0.350 | 0.087 |
| 5-methyl-furfural | 0.000 | 0.057 | 0.056 | 0.000 | 0.000 |
| Diketones | 0.37 | 0.38 | 0.26 | 0.18 | 0.030 |
| 2,3-hexane-dione | 0.102 | 0.042 | 0.045 | 0.000 | 0.000 |
| 2-methyl-pyrazine | 0.000 | 0.051 | 0.049 | 0.037 | 0.000 |

TABLE 7

| Component | Folgers ® Product | Krogers ® Product |
| --- | --- | --- |
| Total Aroma | 3.5 | 1.0 |
| Furans | 0.480 | 0.073 |
| 5-methyl-furfural | 0.000 | 0.000 |
| Diketones | 0.090 | 0.00 |
| 2,3-hexane-dione | 0.000 | 0.000 |
| 2-methyl-pyrazine | 0.000 | 0.000 |

The beverages of Examples 1 and 5 contain levels of total aroma and furans at least as high as beverages produced from the commercially available products. Further, the beverages of Examples 1 and 5 contain at least 100% more diketones than the commercially available beverage with the next highest levels. Diketones are responsible for providing coffee beverages with buttery notes and are desirable. The beverages of Examples 1 and 5 also contain detectable levels of 2,3-hexanedione while the other beverages do not.

Example 7

The process of Example 1 is repeated at a stripping rate of 90% by weight of steam compared to roast and ground coffee. The aromatized gas stream leaving the stripping column is then subjected to concentration by freeze condensation.

The concentrated liquid leaving the freeze concentration system is collected and comprises about 10% by weight of the roast and ground coffee.

The aroma strength of a beverage produced from the powder of this example is compared to that of a beverage produced from the powder of Example 3:

TABLE 8

| Sample | Aroma Count (grams of roast and ground coffee equivalents) |
| --- | --- |
| Example 7 | 11 |
| Example 3 | 1.5 |

The beverage produced from the powder of this example has much higher aroma counts. Further, the beverage produced from the powder of Example 3 is perceived to have less flavor and aroma.

Example 8

Five commercially available coffee products are used: a NESCAFÉ GOLD product purchased in the UK, a MAXUM product, an ALTA RICA product, and a CARTE NOIRE product; a soluble powder produced according to Example 5 at 90% strip with frost addition, a soluble powder produced according to Example 5 at 90% strip without frost addition, a soluble powder produced according to Example 5 at 60% strip without frost addition, a soluble powder produced according to Example 5 at 40% strip without frost addition, and a soluble powder produced according to Example 4 at 40% strip without frost addition. All products are freeze-dried.

A teaspoon of each soluble powder is dissolved in 150 ml of hot water at 85° C. and the beverage analyzed for aroma components. Further, roasted coffee beans are brewed in a commercial brew device to provide a beverage of substantially the same strength as the beverages produced from the soluble powders. The results are as follows:

TABLE 9

| Component | Brew | Example 5 (90% strip + Frost) | Example 5 (90% strip) | Example 5 (60% strip) | Example 5 (40% strip) |
| --- | --- | --- | --- | --- | --- |
| Total Aroma | 12.1 | 9.5 | 6.8 | 3.3 | 4.8 |
| Furans | 3.250 | 2.230 | 0.910 | 0.700 | 0.770 |
| 5-methyl-furfural | 0.114 | 0.117 | 0.118 | 0.071 | 0.069 |
| Diketones | 0.632 | 0.740 | 0.750 | 0.410 | 0.570 |
| 2,3-hexane-dione | 0.110 | 0.112 | 0.102 | 0.050 | 0.073 |
| 2-methyl-pyrazine | 0.112 | 0.092 | 0.082 | 0.052 | 0.053 |

TABLE 10

| Component | Example 4 (40% strip) | Nescafé ® Gold product | Maxum ® product | Alta Rica ® Product | Carte Noir ® Product |
| --- | --- | --- | --- | --- | --- |
| Total Aroma | 4 | 2.7 | 3.2 | 3.3 | 3.0 |
| Furans | 0.720 | 0.350 | 0.590 | 0.300 | 0.370 |
| 5-methyl-furfural | 0.064 | 0.000 | 0.000 | 0.000 | 0.000 |
| Diketones | 0.560 | 0.180 | 0.120 | 0.320 | 0.330 |
| 2,3-hexane-dione | 0.066 | 0.000 | 0.000 | 0.047 | 0.340 |
| 2-methyl-pyrazine | 0.044 | 0.000 | 0.000 | 0.000 | 0.000 |

The beverage produced by the powder of Example 5 at 90% strip and with frost addition has an aroma compound profile which is substantially identical to that of brew coffee.

Further, the beverage has a brew-like flavor and aroma. All of the beverages produced from the powders of Examples 4 and 5 have much higher levels of furans, 5-methyl furfural, diketones, 2,3-hexanedione and 2-methyl-pyrazine. The furans are responsible for providing beverages with toasted notes and are highly desirable. The beverages produced from the powders of Examples 4 and 5 are perceived to have more brew-like flavor and aroma, roastiness, body and balance than the beverages produced from commercially available powders.

DEPOSIT OF COMPUTER PROGRAM LISTINGS

Not applicable

What is claimed is:

1. An aromatized, soluble coffee powder which comprises at least about 0.60 equivalent μg/g furans and at least about 0.40 equivalent μg/g diketones and which is produced by a process including the steps of:
   providing a slurry of coffee grounds in an aqueous liquid;
   stripping aroma components from the slurry using gas in a substantially counter-current manner for providing an aromatized gas containing aroma components;
   collecting the aroma components from the aromatized gas;
   extracting soluble coffee solids from coffee grounds and concentrating the extracted soluble coffee solid for providing a concentrated coffee extract;
   combining the concentrated coffee extract and the collected aroma components for providing an aromatized extract; and
   drying the aromatized extract for providing the aromatized coffee powder.

2. A coffee powder according to claim 1, which further comprises at least about 0.02 equivalent μg/g of each of 5-methylfurfural and 2,3-hexanedione.

3. An aromatized, freeze-dried soluble coffee powder which comprises least about 0.60 equivalent μg/g farans and at least about 0.40 equivalent μg/g diketones.

4. A coffee powder according to claim 3 which further comprises at least 0.02 equivalent μg/g of each of 5-methylfurfural and 2,3-hexanedione.

5. A coffee powder according to claim 3 which comprises at least about 0.65 equivalent μg/g furans, and at least about 0.04 equivalent μg/g of each of 5-methylfurfural, 2-methyl-pyrazine and 2,3-hexanedione.

6. A coffee powder according to claim 1, wherein the extract is spray-dried.

7. A coffee powder according to claim 1 wherein the extract is freeze-dried.

8. A coffee powder according to claim 6 which further includes at least about 0.02 equivalent μg/g of each of 5-methylfurfural and 2,3-hexanedione.

9. An aromatized, soluble coffee powder which includes at least about 0.60 equivalent μg/g furans and at least about 0.40 equivalent μg/g diketones.

10. A coffee powder according to claim 9 which further includes at least 0.02 equivalent μg/g of each of 5methylfurfural and 2,3-hexanedione.

11. A coffee powder according to claim 9 which comprises at least about 0.65 equivalent μg/g furans, and at least about 0.04 equivalent μg/g of each of 5-methylfurfural, 2-methyl-pyrazine and 2,3-hexanedione.

12. A coffee powder according to claim 9, which is prepared by a process which comprises:
   providing a slurry of coffee grounds in an aqueous liquid;
   stripping aroma components from the slurry using gas in a substantially counter-current manner for providing an aromatized gas containing aroma components;
   collecting the aroma components from the aromatized gas;
   extracting soluble coffee solids from coffee grounds and concentrating the extracted soluble coffee solid for providing a concentrated coffee extract;
   combining the concentrated coffee extract and the collected aroma components for providing an aromatized extract; and
   drying the aromatized extract for providing the aromatized coffee powder.

13. A coffee powder according to claim 12 wherein the extract is spray-dried.

14. A coffee powder according to claim 9, which is prepared by a process which comprises:
   providing a slurry of coffee grounds in an aqueous liquid;
   stripping aroma components from the slurry using gas in a substantially counter-current manner for providing an aromatized gas containing aroma components;
   collecting the aroma components from the aromatized gas;
   extracting soluble coffee solids from coffee grounds and concentrating the extracted soluble coffee solid for providing a concentrated coffee extract;
   combining the concentrated coffee extract and the collected aroma components for providing an aromatized extract; and
   drying the aromatized extract for providing the aromatized coffee powder.

15. A coffee powder according to claim 18 wherein the extract is freeze-dried.

* * * * *

UNITED STATES PATENT AND TRADEMARK OFFICE
CERTIFICATE OF CORRECTION

PATENT NO. : 6,358,552 B1
DATED : March 19, 2002
INVENTOR(S) : Mandralis et al.

It is certified that error appears in the above-identified patent and that said Letters Patent is hereby corrected as shown below:

Column 11,
Line 40, change "farans" to -- furans --.

Column 12,
Line 49, change "claim 18" to -- claim 14 --.

Signed and Sealed this

Twentieth Day of August, 2002

Attest:

Attesting Officer

JAMES E. ROGAN
Director of the United States Patent and Trademark Office